US011049150B2

(12) United States Patent
Calauzènes et al.

(10) Patent No.: US 11,049,150 B2
(45) Date of Patent: Jun. 29, 2021

(54) GENERATION OF INCREMENTAL BIDDING AND RECOMMENDATIONS FOR ELECTRONIC ADVERTISEMENTS

(71) Applicant: Criteo SA, Paris (FR)

(72) Inventors: Clément Calauzènes, Paris (FR); Christophe Renaudin, Paris (FR); Alexandre Gilotte, Paris (FR); Eustache Diemert, Claix (FR)

(73) Assignee: Criteo SA, Paris (FR)

( * ) Notice: Subject to any disclaimer, the term of this patent is extended or adjusted under 35 U.S.C. 154(b) by 330 days.

(21) Appl. No.: 16/016,412

(22) Filed: Jun. 22, 2018

(65) Prior Publication Data
US 2019/0392485 A1 Dec. 26, 2019

(51) Int. Cl.
*G06Q 30/00* (2012.01)
*G06Q 30/02* (2012.01)
*G06F 7/58* (2006.01)

(52) U.S. Cl.
CPC ..... *G06Q 30/0275* (2013.01); *G06Q 30/0244* (2013.01); *G06Q 30/0273* (2013.01); *G06Q 30/0277* (2013.01); *G06F 7/588* (2013.01)

(58) Field of Classification Search
CPC .................. G06Q 30/0207–0277; G06F 7/588
See application file for complete search history.

(56) References Cited

U.S. PATENT DOCUMENTS

| | | | |
|---|---|---|---|
| 7,788,159 B1 * | 8/2010 | Sack | G06Q 40/04 705/37 |
| 8,719,082 B1 * | 5/2014 | Snyder | G06Q 30/0275 705/14.1 |
| 8,990,105 B1 | 3/2015 | Shatkin-Margolis et al. | |
| 9,947,029 B2 * | 4/2018 | Collette | G06Q 30/0277 |
| 10,169,778 B1 | 1/2019 | Collin et al. | |
| 10,282,758 B1 | 5/2019 | Els et al. | |

(Continued)

OTHER PUBLICATIONS

Feldman, Jon, et al. "Budget Optimization in Search-Based Advertising Auctions." EC2007, San Diego, CA, Jun. 11-15, 2007. (Year: 2007).*

(Continued)

*Primary Examiner* — Luis A Brown
(74) *Attorney, Agent, or Firm* — Proskauer Rose LLP

(57) ABSTRACT

Methods and systems are described herein for incremental bidding for electronic advertisements. A computing device generates, for a user during a first time period, first randomized bids for available impression opportunities, the first randomized bids based upon an estimated value and a first random factor and using a context of bid requests. The computing device transmits the first randomized bids to a remote device. The computing device determines whether interaction events associated with impression opportunities occurred. The computing device estimates second randomized bids based upon an estimated value and a second random factor and using the context. The computing device estimates a relative incrementality of a bidding policy based upon the second randomized bids over a bidding policy based upon the first randomized bids, and optimizes the bidding policy based upon second randomized bids. The computing device changes a production bidding policy based upon the optimized policy.

36 Claims, 4 Drawing Sheets

(56) References Cited

U.S. PATENT DOCUMENTS

| | | |
|---|---|---|
| 2002/0120504 A1 | 8/2002 | Gould et al. |
| 2002/0138402 A1* | 9/2002 | Zacharia ............... G06Q 40/04 705/37 |
| 2003/0187923 A1 | 10/2003 | Kimura et al. |
| 2003/0220866 A1 | 11/2003 | Pisaris-Henderson et al. |
| 2005/0033641 A1 | 2/2005 | Jha et al. |
| 2006/0041638 A1 | 2/2006 | Whittaker et al. |
| 2006/0074749 A1* | 4/2006 | Kline ............... G06Q 30/0269 705/14.48 |
| 2006/0085275 A1 | 4/2006 | Stokes |
| 2006/0218035 A1 | 9/2006 | Park et al. |
| 2006/0253319 A1 | 11/2006 | Chayes et al. |
| 2007/0130009 A1* | 6/2007 | Steelberg ............... H04L 67/20 705/14.46 |
| 2007/0150353 A1 | 6/2007 | Krassner et al. |
| 2007/0162926 A1* | 7/2007 | Steelberg ............ H04L 63/0428 725/34 |
| 2007/0168506 A1 | 7/2007 | Douglas et al. |
| 2007/0204014 A1 | 8/2007 | Greer et al. |
| 2008/0004962 A1 | 1/2008 | Muthukrishnan et al. |
| 2008/0021791 A1* | 1/2008 | Steelberg ............ G06Q 30/0267 705/14.68 |
| 2008/0021792 A1* | 1/2008 | Steelberg ............ H04L 63/0428 705/26.3 |
| 2008/0103953 A1* | 5/2008 | Flake ............... G06Q 40/04 705/37 |
| 2008/0243592 A1 | 10/2008 | Song et al. |
| 2008/0250453 A1* | 10/2008 | Smith ............... G06Q 30/0273 725/39 |
| 2008/0255921 A1* | 10/2008 | Flake ............... G06Q 30/0283 705/14.71 |
| 2009/0024737 A1 | 1/2009 | Goldspink et al. |
| 2009/0063491 A1 | 3/2009 | Barclay et al. |
| 2009/0089151 A1 | 4/2009 | Protheroe et al. |
| 2009/0125719 A1 | 5/2009 | Cochran et al. |
| 2009/0172091 A1 | 7/2009 | Hamel |
| 2009/0254414 A1 | 10/2009 | Schwarz et al. |
| 2010/0057566 A1 | 3/2010 | Itzhak |
| 2010/0094704 A1 | 4/2010 | Subramanian et al. |
| 2010/0125506 A1 | 5/2010 | Vassilvitskii et al. |
| 2010/0161438 A1* | 6/2010 | Tomak ............... G06Q 30/0601 705/26.1 |
| 2010/0198772 A1 | 8/2010 | Silverman et al. |
| 2010/0217797 A1 | 8/2010 | Kirsch et al. |
| 2010/0262497 A1* | 10/2010 | Karlsson ............... G06Q 30/02 705/14.71 |
| 2010/0262499 A1* | 10/2010 | Karlsson ............ G06Q 30/0276 705/14.72 |
| 2011/0035259 A1 | 2/2011 | Das et al. |
| 2011/0071899 A1* | 3/2011 | Robertson ............... G06Q 30/02 705/14.43 |
| 2011/0087543 A1 | 4/2011 | Coon |
| 2011/0125577 A1 | 5/2011 | Song et al. |
| 2011/0125595 A1 | 5/2011 | Neal et al. |
| 2011/0131099 A1 | 6/2011 | Shields et al. |
| 2011/0185016 A1 | 7/2011 | Kandasamy et al. |
| 2011/0225637 A1 | 9/2011 | Counterman |
| 2011/0251901 A1* | 10/2011 | Kwon ............... G06Q 30/0275 705/14.71 |
| 2011/0276413 A1* | 11/2011 | Lee ............... G06Q 30/0275 705/14.71 |
| 2011/0282751 A1* | 11/2011 | Kwon ............... G06Q 30/08 705/14.71 |
| 2012/0054019 A1 | 3/2012 | Kitts et al. |
| 2012/0143713 A1 | 6/2012 | Dittus et al. |
| 2012/0173981 A1 | 7/2012 | Day |
| 2012/0271883 A1 | 10/2012 | Montoya et al. |
| 2012/0310729 A1 | 12/2012 | Dalto et al. |
| 2012/0316957 A1* | 12/2012 | Zhou ............... G06Q 30/0275 705/14.46 |
| 2013/0060644 A1* | 3/2013 | Le Ouay ............ G06Q 30/0241 705/14.69 |
| 2013/0080264 A1* | 3/2013 | Umeda ............... G06Q 30/02 705/14.69 |
| 2013/0346218 A1* | 12/2013 | Liu ............... G06Q 30/02 705/14.71 |
| 2014/0025509 A1* | 1/2014 | Reisz ............... G06Q 30/0244 705/14.71 |
| 2014/0058812 A1 | 2/2014 | Bender et al. |
| 2014/0172614 A1* | 6/2014 | Friedman ............... G06Q 30/08 705/26.3 |
| 2014/0207639 A1* | 7/2014 | Unetich ............... G06Q 40/04 705/37 |
| 2015/0019331 A1* | 1/2015 | Chambard ............ G06Q 30/0255 705/14.53 |
| 2015/0287097 A1* | 10/2015 | Umeda ............... G06Q 30/0275 705/14.71 |
| 2015/0302470 A1 | 10/2015 | Dru et al. |
| 2015/0317670 A1 | 11/2015 | Cavander et al. |
| 2016/0307236 A1* | 10/2016 | Lidow ............... G06Q 30/0275 |
| 2017/0116645 A1* | 4/2017 | Bishop ............... G06Q 30/0277 |
| 2017/0193561 A1* | 7/2017 | Shen ............... G06Q 30/0275 |
| 2017/0330243 A1* | 11/2017 | Fuqua ............... G06Q 30/0275 |
| 2018/0040032 A1* | 2/2018 | Chalasani ............ G06Q 30/0243 |
| 2018/0108049 A1* | 4/2018 | Kitts ............... G06Q 30/0275 |
| 2018/0204250 A1* | 7/2018 | Watine ............... G06Q 30/0275 |
| 2019/0130456 A1* | 5/2019 | De La Breteche .... G06N 7/005 |
| 2019/0164175 A1 | 5/2019 | Dilling et al. |

OTHER PUBLICATIONS

Karlsson, Niklas. "Control Problems in Online Advertising and Benefits of Randomized Bidding Strategies." European Journal of Control, 2016. (Year: 2016).*

Chrobak, Marek. "Incremental Medians via Online Bidding." Lecture Notes in Computer Science, vol. 3887, 2006. (Year: 2006).*

* cited by examiner

GENERATION OF INCREMENTAL BIDDING AND RECOMMENDATIONS FOR ELECTRONIC ADVERTISEMENTS

TECHNICAL FIELD

The present technology relates to electronic advertisements, and, more particularly, to techniques for generation of incremental bidding and recommendations for electronic advertisements.

BACKGROUND

Publisher systems can provide webpages or other online content that can include one or more advertisement display opportunities for computerized graphical advertisement displays (e.g., space for a banner advertisement across the top of the webpage, within an application, or within other media such as videos or images). In some instances, when a user device (e.g., a computer running a web browser) processes a webpage for display, the user device can request, from an ad system, graphical display source code for a computerized graphical advertisement display for one of the advertisement display opportunities. The ad system can provide the graphical display source code to the user device to render and/or display.

As part of the advertisement selection process, the ad system communicates with real-time bidding (RTB) computing platforms. The RTB platforms receive bids from various third-party bidding agent systems (also called demand-side platforms (DSP)) that submit bids for the advertisement display opportunity on behalf of advertisers. Typically, the bidding agent systems are responsible for generating a bid for advertisement opportunities that meet the advertiser's requirements, such as cost, value, and audience considerations. The RTB platforms coalesce the bids received from the various DSPs and determine whether the advertisement display opportunity is selected after analyzing the received bids.

In addition, the advertisement selection process includes determining the content of the digital advertisement, including elements such as products to be displayed and recommended to a user in the advertisement. Typically, the ad system selects one or more products from a catalog, based upon characteristics and preferences of the user that will be viewing and interacting with the ad.

The concept of incrementality can be used in the context of bidding and recommendation systems for electronic advertising. Incrementality refers to the quantity of events that can be proved to be causally generated by an action, usually measured through a randomized control trial. For instance, if an advertiser is interested in the incrementality of an ad campaign in terms of conversions, he or she can use the following protocol: first, randomly split users between an exposed and control population—which will respectively be shown ads (exposed) or not (control). The observed difference in conversions between both populations is the quantity of interest. This kind of experiment is often called an "incrementality test."

In some instances, data from incrementality tests can be used to learn a model of incremental quality (also called an uplift model). The uplift model would be used then at bidding time to infer the incremental quality of a particular ad auction. For data collection, care must be taken to avoid selection bias between the exposed and control populations. In particular, when considering a sequence of ad auctions in a dynamic ad platform, only the first one can actually be used. Otherwise, users having a chance to be exposed in the first auction could have a larger probability to be exposed again as they could have clicked on a previous ad (something that is not possible for the control group). As a result, one could only learn from the first interaction of users with the system which would actually shrink the available data over time.

For learning the uplift model, certain implementations actually learn two models: a first model for the control population and a second model for the exposed population. For instance, one model could be learned to predict conversions of an exposed user, while another model would learn the same for a control user. A pitfall of this strategy is that these two models learn in isolation, leading to situations where they do not focus their capacity on the uplift but rather on their respective objective. Also, an uplift model is costly as it involves running a randomized experiment with a control population that is not receiving advertising, incurring a processing overhead and revenue opportunity loss. Another limitation of uplift models is that they do not inform the bidding or recommendation strategy directly. It is still up to the bidder to decide how to integrate the predicted uplift in its strategy, which in some cases could be quite involved and/or completely heuristical.

SUMMARY

Accordingly, there is a need for technology to dynamically and programmatically identify improved bidding and recommendation policies associated with advertisement display opportunities by collecting and analyzing data from a randomized policy and use it to learn a better policy using incrementality techniques. The techniques described herein beneficially change the intervention (randomization) periodically which permits the system to gather data samples efficiently: e.g., a data sample for each period of each user instead of one sample per user. Sampling efficiency is important because the uplift sought is typically small and generally the system needs a large number of samples to perform efficiently. In addition, the techniques described herein leverage randomization of the actions (bids/recommendations) but every user is still subject to advertising. Also, the techniques directly result in a bidding/recommendation policy derived from a causal inference framework.

In general terms, the system and method described herein advantageously conduct a bid randomization phase by multiplying outgoing bids by a random number drawn from a known distribution, and then capturing data (context/user features, drawn random multiplier and outcome (e.g., user action taken with respect to the impression opportunity for which the bid was submitted)) relating to the auction for which the randomized bids were submitted. Using a statistical technique called importance sampling, the system and method then infer what would have happened if a different randomization factor and/or random distribution was used to modify the bids. This technique can be used to simulate the outcome of a candidate bidding policy without requiring application of the bidding policy in a production environment.

Going one step further, the system and method can use this technique to find the best bidding policy in a family of policies with respect to an incremental target. Once estimated, the system and method can then replace a production bidding policy with the best candidate policy. The bidding policy determination can be repeated and improves the incrementality of a bidder, starting from a current production policy. A practical improvement is to optimize for an incremental proxy (e.g. incremental visits or sessions as opposed to conversions) to find good policies faster/with less data. A second improvement is to approximate the target function to make optimization tractable.

In one aspect, there is a computerized method of incremental bidding for electronic advertisements. A bid determination computing device generates, for a first user during a first time period, one or more first randomized bids for available impression opportunities presented to a user via a remote computing device in response to one or more bid requests from the remote computing device. The first randomized bids are based upon an estimated value and a first random factor selected from a first randomized policy and using a context of the one or more bid requests. The bid determination computing device transmits the one or more first randomized bids to the remote computing device in response to the one or more bid requests. The bid determination computing device determines whether one or more interaction events associated with available impression opportunities occurred prior to receiving the one or more bid requests, the interaction events associated with user input provided by the user to the remote computing device. The bid determination computing device estimates one or more second randomized bids for the available impression opportunities based upon the estimated value and a second random factor selected from a second randomized policy and using the context of the one or more bid requests. The bid determination computing device estimates a relative incrementality of a bidding policy based upon the second randomized bids over a bidding policy based upon the first randomized bids. The bid determination computing device optimizes the bidding policy based upon the second randomized bids using a search function based upon the estimated relative incrementality. The bid determination computing device changes a production bidding policy based upon the optimized bidding policy.

In another aspect, there is a system for incremental bidding for electronic advertisements. The system comprises a bid determination computing device that generates, for a first user during a first time period, one or more first randomized bids for available impression opportunities presented to a user via a remote computing device in response to one or more bid requests from the remote computing device. The first randomized bids are based upon an estimated value and a first random factor selected from a first randomized policy and using a context of the one or more bid requests. The bid determination computing device transmits the one or more first randomized bids to the remote computing device in response to the one or more bid requests. The bid determination computing device determines whether one or more interaction events associated with available impression opportunities occurred prior to receiving the one or more bid requests, the interaction events associated with user input provided by the user to the remote computing device. The bid determination computing device estimates one or more second randomized bids for the available impression opportunities based upon the estimated value and a second random factor selected from a second randomized policy and using the context of the one or more bid requests. The bid determination computing device estimates a relative incrementality of a bidding policy based upon the second randomized bids over a bidding policy based upon the first randomized bids. The bid determination computing device optimizes the bidding policy based upon the second randomized bids using a search function based upon the estimated relative incrementality. The bid determination computing device changes a production bidding policy based upon the optimized bidding policy.

Any of the above aspects can include one or more of the following features. In some embodiments, the remote computing device is a real-time bidding platform, an ad exchange, an ad server, a computing device executing an auction for the available impression opportunities within a browser, or a computing device executing an auction for the available impression opportunities within a native application. In some embodiments, the one or more interaction events include a view, a click, a conversion, a marketing signup, an account creation, an app installation, or an add-to-cart action.

In some embodiments, the bid determination computing device generates each first randomized bid by multiplying an initial bid for an available impression opportunity by the first random factor. In some embodiments, the first random factor is not randomized for the first user during the first time period. In some embodiments, the bid determination computing device updates the first random factor by selecting another random factor from the first randomized policy.

In some embodiments, determining a relative incrementality is based upon an importance sampling technique. In some embodiments, the importance sampling technique comprises one or more of: capped importance sampling, self-normalized importance sampling, doubly-robust importance sampling, or variance penalized importance sampling. In some embodiments, the search function used to optimize the bidding policy based upon the second randomized bids is a gradient descent function or a genetic algorithm.

In some embodiments, the bid determination computing device generates one or more subsequent bids for available impression opportunities in response to one or more bid requests using the changed bidding policy. In some embodiments, the available impression opportunities are presented via a webpage on the remote computing device. In some embodiments, a definition of the first randomized policy and a definition of the second randomized policy are different.

In some embodiments, a bid determination computing device generates, for the first user during one or more additional time periods, one or more additional randomized bids for available impression opportunities to be presented to the user via a remote computing device in response to one or more bid requests from the remote computing device. The additional randomized bids are based upon an estimated value and another random factor selected from the first randomized policy at a start of each additional time period. The bid determination computing device transmits the one or more additional randomized bids to the remote computing device in response to the one or more bid requests, and determines whether one or more interaction events associated with the available impression opportunities occurred during the additional time periods.

In some embodiments, the first time period and the one or more additional time periods are the same length. In some embodiments, optimizing the bidding policy based upon the second randomized bids using a search function comprises maximizing the estimated relative incrementality. In some embodiments, the first context of the one or more bid requests comprises a context of the first user at a start of the first period. In some embodiments, the first context of the one or more bid requests comprises historical data for one or more prior impression opportunities associated with the user.

In some embodiments, the second randomized policy is deterministic. In some embodiments, the available impression opportunities are presented to the user via a website displayed in a browser application on a client computing device of the user. In some embodiments, the available impression opportunities are presented to the user via a native application on a client computing device of the user.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology provides systems and methods for incremental bidding for electronic advertisements for electronic advertisements, particularly computerized graphical display advertisements. Although the technology is illustrated and described herein with reference to specific embodiments, the technology is not intended to be limited to the details shown. Various modifications can be made in the details within the scope the claims and without departing from the technology.

Figure 1:
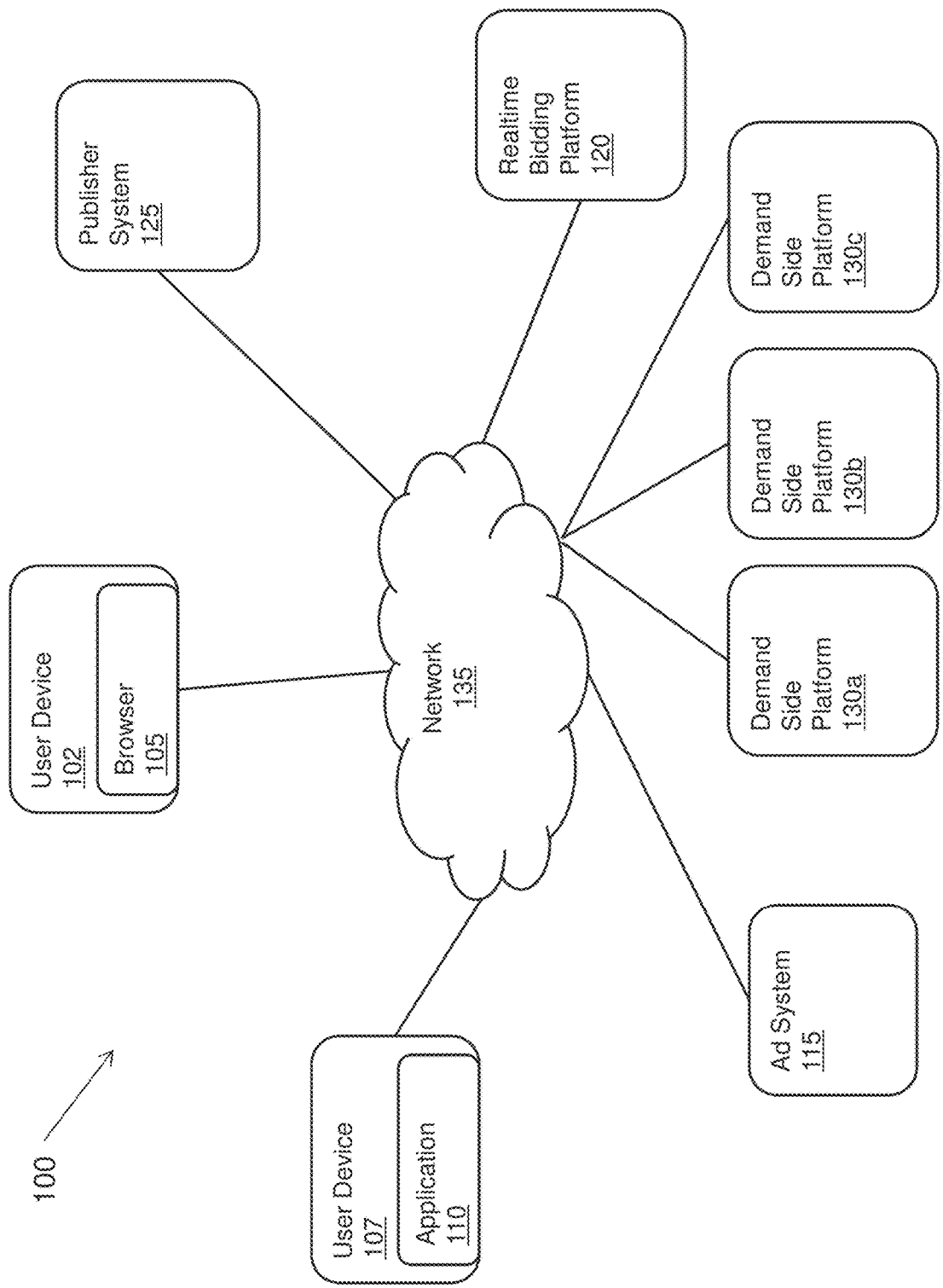
FIG. 1 is a diagram of a networked system in accordance with embodiments of the technology.

FIG. 1 is a diagram of networked system 100 in accordance with embodiments of the technology. As illustrated, networked system 100 can include user device 102, user device 107, ad system 115, RTB platform 120, publisher system 125, and DSPs 130a-130c. User device 102, user device 107, ad system 115, RTB platform 120, publisher system 125, and DSPs 130a-130c can be in data communication via network 135. User devices 102 and 107 can each be any computing devices. In some embodiments, user devices 102 and 107 can each be one of a mobile computing device (e.g., cellular phones and/or tablets), a PC, or other computing device. User device 102 executes web browser 105. User device 107 executes application 110 (e.g., a mobile application that interacts with online content).

Ad system 115 can be any computing device, such as a server or multiple servers. For example, ad system 115 can be an ad exchange, an ad server, or a computing device executing an auction locally within a browser. In some embodiments, ad system 115 can collect behavioral data for a plurality of devices, browsers, and/or applications. In some embodiments, ad system 115 can receive behavioral data for a plurality of devices, browsers, and/or applications from third-parties. In some embodiments, ad system 115 can provide graphical display source code for a computerized graphical advertisement display in accordance with the present technology.

RTB platform 120 can be any computing device, such as a server or multiple servers. In some embodiments, RTB platform 120 can perform auctions for advertising display opportunities in online media, such as webpages or application content served by publisher system 125, that are provided to user devices 102 and/or 107. Ad system 115 can submit bids for such advertising opportunities, and if ad system 115 wins the auction, ad system 115 can provide source code or other display data for a computerized graphical advertisement display to fill the advertising display opportunity. Publisher system 125 can be any computing device, such as a server or multiple servers. In some embodiments, publisher system 125 can serve webpages to browser 105. In some embodiments, publisher system 125 can serve other content to application 110. In some embodiments, publisher system 125 can communicate with ad system 115 to determine whether ad system 115 will provide source code for a computerized graphical advertisement display to fill an advertisement display opportunity in a webpage or application content.

DSPs 130a-130c can be any computing device, such as a server or multiple servers. In some embodiments, DSPs 130a-130c can receive bid requests from RTB platform 120 and generate bids on behalf of advertisers, which the DSPs 130a-130c then submit to the RTB platform in response to the bid requests. In some embodiments, the DSPs and RTB platform communicate using a specialized application programming interface (API), using specifically-formatted data requests and responses. Network 135 can be any network or multiple networks. For example, network 135 can include cellular networks through which user devices 102 and 107 are connected and the Internet.

Figure 2:
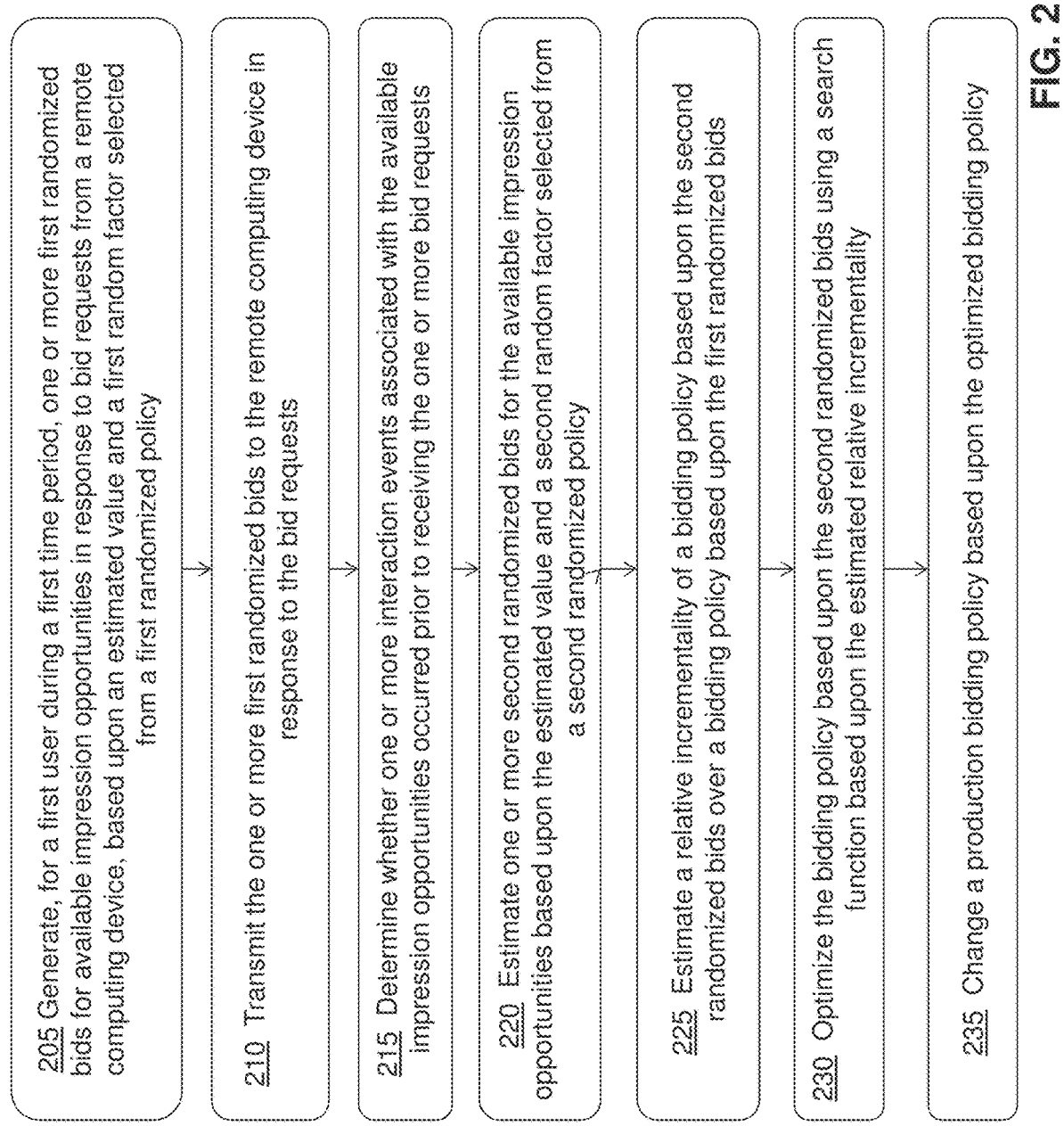
FIG. 2 depicts a flow chart of a computerized method of incremental bidding for electronic advertisements.

FIG. 2 is a flow diagram of a method of incremental bidding for electronic advertisements, using the system 100 of FIG. 1. An ad system (e.g., ad system 115) receives a bid request, or a plurality of bid requests, for a computerized graphical advertisement display to be inserted into one or more impression opportunities to be presented to a user at a remote device (e.g., user devices 102 or 107). The request can be received from a browser or other application executing on a user device (e.g., browser 105 displaying a webpage that contains one or more impression opportunities on user device 102). The ad system transmits the request to the real-time bidding platform 120 and the RTB platform 120 transmits the bid request to the DSPs 130a-130c for requisition of corresponding bids for the impression opportunity. Each DSP 130a-130c receives the bid request for the available impression opportunities from the RTB platform 120. It should be appreciated that, in some embodiments, the DSPs 130a-130c can receive the bid request from an ad exchange, an ad server (e.g., server 115), a computing device executing an auction for the available impression opportunity within a browser (e.g., user device 102 executing a local auction in browser 105), or a computing device executing an auction for the available impression opportunity within an application (e.g., user device 107 executing a local auction in application 110).

At step 205, the DSPs 130a-130c generate one or more first randomized bids for the available impression opportunities, for a first user (e.g., user at the user device) during a first time period, in response to the bid requests received from the RTB platform 120 (or whichever remote computing device transmitted the bid requests to the DSPs 130a-130c). The DSP 130a-130c determines a first random factor selected from a first randomized policy to use in generating the first randomized bids. As used herein, a randomized policy is a probability distribution used by the system to determine the random factor. In some embodiments, the choice of the distribution of the randomized policy from which the DSP 130a-130c determines the random factor is usually governed by its support and expected value. For bidding, a gamma or log-normal distribution is a typical choice as support is [0, +infinity] and with chosen parameters the expected value can be 1, which guarantees that randomized bids have the same average value than non-randomized bids and incur little cost.

For each impression opportunity, the DSPs 130a-130c have an opportunity to display a graphical advertisement. The DSPs 130a-130c compute the expected value for the advertiser should it win the ad auction based on available information. The DSPs 130a-130c generate the first randomized bids by multiplying an initial bid by a random number according to Equation 1 below. In some embodiments, the random number is not randomized for a given user and time period (e.g., first user during the first time period) and drawn independently from a known randomized policy. Also, in some embodiments, the first random factor can be updated during a subsequent time period by selecting another random factor from the first probability distribution. In some embodiments, a typical solution is to use a unique user identifier and a timestamp. The period would be computed form the timestamp using modulo:

Period=timestamp % period_length

A random number generator (such as a Mersenne Twister algorithm) is seeded with a value comprising both the unique user identifier and the period before being used to generate the first bid factor.

bid=value(opportunity)×random(user,period)   Equation 1:

It should be noted that random(user, period) in Equation 1 is equal to $B_i$, as described below.

Figure 3:
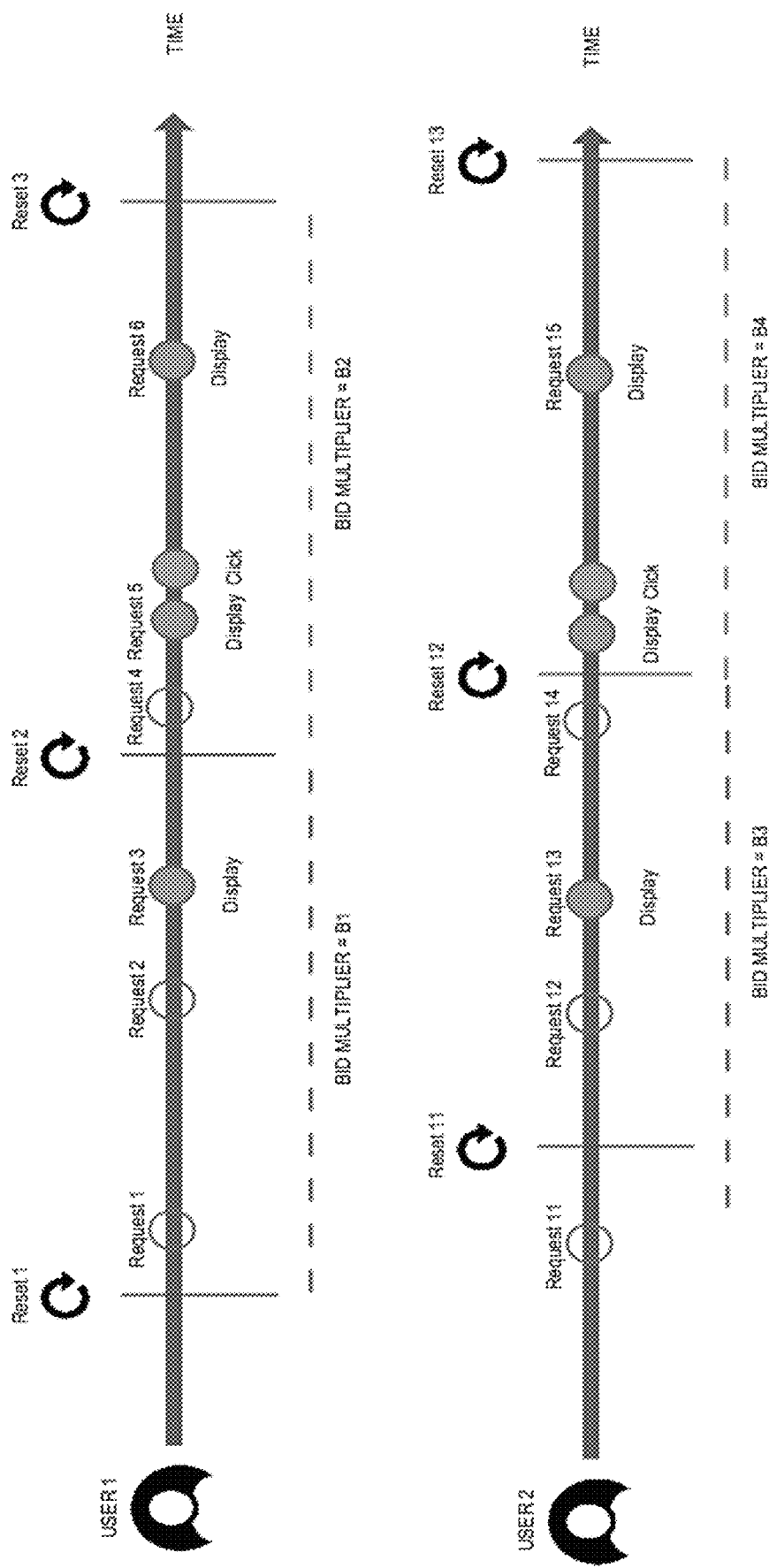
FIG. 3 is a diagram of a bid randomization procedure in accordance with embodiments of the technology.

FIG. 3 is a diagram of bid randomization performed by the DSPs 130a-130c in step 205. As shown in FIG. 3, outgoing bids for requests received from a remote device associated with User 1 during a first time period (labeled Request 1, Request 2, and Request 3) are multiplied by random factor B1. Upon conclusion of the first time period, the data is reset and subsequent bids for requests during the second time period (labeled Request 4, Request 5, and Request 6) are multiplied by random factor B2.

Similarly, outgoing bids for requests received from a remote device associated with User 2 (labeled Request 12, Request 13, and Request 14) during a first time period are multiplied by random factor B3, and outgoing bids for requests received during a second time period (labeled Request 15) are multiplied by random factor B4. Note that B1, B2, B3 and B4 are drawn independently so as to be usable by the importance sampling estimator. Also, periods are of the same length for every user but their start time is chosen randomly so that bid multipliers are not updated for all users at the same time (doing so could impact a production bidding system). A practical solution is to draw once and for all a random time origin per user and compute the period as:

Period=(timestamp−time_origin(user)) % period_length

At step 210, once the outgoing bids are randomized, the DSPs 130a-130c transmit the randomized bids to the remote device (e.g., RTB platform 120) in response to the bid requests. If the randomized bid submitted by the DSP is selected by the RTB platform as the winning bid, the RTB platform generates graphical display source code to be inserted into the available impression opportunity. The RTB platform 120 transmits the graphical display source code to the ad system 115 for display on the user device (e.g., device 102 or 107). If an interaction event occurs for the graphical display source code during the time period, the ad system 115 records the interaction event and notifies the RTB platform 120 and DSPs 130a-130c of the occurrence of the interaction event, as well as providing certain metadata relating to the interaction event (e.g., type of interaction, outcome (if any), etc.). In some embodiments, interaction events can include the display (or view) of an ad to the user, the user clicking on the ad, a conversion (or purchase by the user) of a product associated with the ad, a marketing signup associated with the ad, or an account creation associated with the ad.

At step 215, based upon the interaction event information received from the ad system 115, the DSPs 130a-130c determine whether one or more interaction events associated with the available impression opportunities occurred prior to receiving the one or more bid requests. As shown in FIG. 3, for User 1 during the first time period between Reset 1 and Reset 2, one interaction event (e.g., a Display Event) occurred that corresponds to Request 3—as indicated by the gray shaded circle. Note that Requests where no interaction event occurred are not shaded (e.g., Request 1, Request 2).

The DSPs 130a-130c collect data from each time period and each user as follows. First, it should be appreciated that each user produces one data sample per time period. As shown in FIG. 3, User 1 produces two samples: one between Reset 1 and Reset 2 and another one between Reset 2 and Reset 3.

In one embodiment, each data sample i captured by the DSPs 130a-130c consists of:

$B_i$—the random factor drawn for the period, along with the full parametrization of the probability distribution from which it was drawn (in some embodiments, the system can record the probability of drawing $B_i$ given the distribution that was used).

$X_i$—variables describing the context of the user at the start of the period (e.g., for the first period of User 1, it is the context of User 1 exactly at the Reset 1 point in time). In some embodiments, the context of the user comprises historical data for one or more prior impression opportunities associated with the user (e.g., the number of impressions in the prior month) and historical data for prior visits of the user to advertisers' websites (e.g., the number of visit sessions in the prior months).

$Y_i$—variables describing the outcome during the time period (e.g. the number of user interactions, such as conversions (or visits), performed with respect to the ad during that period).

After the data for one or more time periods and users is generated by the DSPs 130a-130c, the DSPs use the data to determine an improved bidding policy based upon incrementality, as follows. At step 220, the DSPs estimate one or more second randomized bids for the available impression opportunities based upon the estimated value noted above and a second random factor selected from a second randomized policy. In some embodiments, a definition of the first randomized policy is different from a definition of the second randomized policy. For example, one policy p1 (probability distribution) is used to generate a set of data d1. This data d1 is used to determine an improved policy p2. Then, the system iterates and p2 is deployed to generate a set of data d2, which is itself used to determine a new improved policy p3, and so on.

Once the notion of sequences of policies pk and associated datasets dk is introduced, it can be generalized such that pk+1 is not only determined using dk, but also all previous datasets d1 . . . dk. There are different ways to use the sequence of datasets to learn pk+1, for instance by only keeping dk, by concatenating d1 . . . dk together, by using them all but downweighting older ones—as is described in A. Agarwal et al., "Effective Evaluation Using Logged Bandit Feedback from Multiple Loggers," KDD '17, Halifax, NS, Canada (2017), which is incorporated herein by reference.

Figure 4:
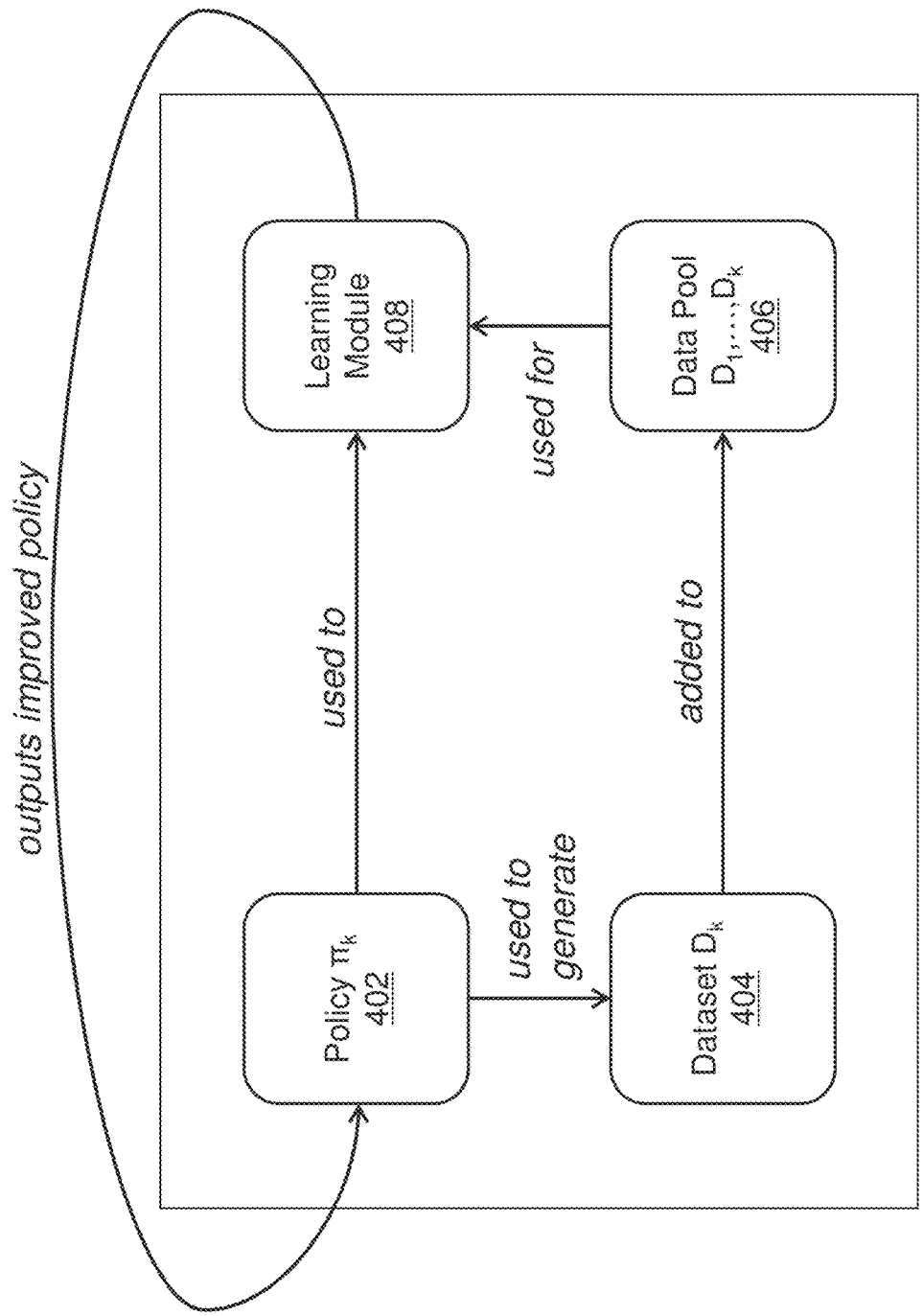
FIG. 4 is a flow diagram of a method for using policies to generate datasets, which in turn are used to generate improved policies.

FIG. 4 is a flow diagram of a method for using policies to generate datasets, which are then added to a data pool that is employed to determine subsequent policies—in order to output an improved policy—in a heuristic manner. As shown in FIG. 4, policy $\pi_k$ 402 generates a dataset $D_k$ 404, which is added to the data pool $D_1, \ldots, D_k$ 406. The data pool is then used in conjunction with the policy $\pi_k$ in a learning module 408 to output an improved policy—which can be fed back into the process flow in order to generate subsequent datasets, and so forth.

Standard importance sampling estimation (as described in A. Owen, "Monte Carlo theory, methods, and examples," (2013), which is incorporated herein by reference) allows inference of properties of a particular distribution, while only having samples generated from a different distribution than the distribution of interest. As applied here, the present systems and methods use importance sampling to infer the expected value of target outcome Y (e.g., conversions) as if the bids for the underlying impression opportunities had been multiplied by a factor different from the random factor that was actually used during the data collection phase described above. This outcome Y is assumed to be a probabilistic function of the user state X and the randomization of the bid B. Estimating the expected value of Y given the randomized bid B drawn according to a probability distribution π and input X is expressed in Equation 2 below.

$$\mathbb{E}_\pi[Y] = \int_{x \in X} \int_{b \in B} Y(x, b) P(X = x) \pi(B = b) dx db \quad \text{Equation 2}$$

Inferring the expected value of Y given bids randomized according to another probability distribution π' can be estimated using importance sampling as in Equation 3 below.

$$\mathbb{E}_{\pi'}[Y] = \int_{x \in X} \int_{b \in B} Y(x, b) \frac{\pi'(B = b)}{\pi(B = b)} P(X = x) \pi(B = b) dx db = \mathbb{E}_\pi\left[Y \frac{\pi'(B)}{\pi(B)}\right] \quad \text{Equation 3}$$

Different types of importance sampling techniques can be used in the context of the methods and systems described herein. For example, the DSPs 130a-130c can use capped importance sampling, self-normalized importance sampling, or doubly-robust importance sampling.

At step 225, the DSPs 130a-130c can then determine a relative incrementality of a bidding policy π' (based upon the second randomized bids) with respect to a bidding policy π (based upon the first randomized opportunity values estimates) that generated empirical data gathered by the DSPs 130a-130c as described above. An estimator or relative incrementality is provided in Equation 4 below.

$$I(\pi', \pi) = \mathbb{E}_{\pi'}[Y] - \mathbb{E}_\pi[Y] \approx \frac{1}{n} \sum_{i=1}^{n} Y_i \times \left(\frac{\pi'(B = b_i)}{\pi(B = b_i)} - 1\right) \quad \text{Equation 4}$$

The estimator I can be used to evaluate the incrementality of a bidding policy π' on data generated by a bidding policy π. In particular, the DSPs 130a-130c can evaluate a policy π' by multiplying π by a factor depending upon the observed user context X as expressed by $f(x)$ in Equation 5 below. Such a bidding policy would act differently based upon the observed values of the user context X.

$$\pi'(B=b, X=x) = \pi(B=b \times f(x)) \quad \text{Equation 5:}$$

The estimator I is rewritten with a stratification on values of the user context X, as shown in Equation 6 below.

$$I(\pi', \pi) = \frac{1}{n} \sum_{i=1}^{n} Y_i \times \left(\frac{\pi(B = b_i \times f(x_i))}{\pi(B = b_i)} - 1\right) \quad \text{Equation 6}$$

At step 230, the DSPs 130a-130c then optimize the bidding policy based upon the second randomized bids using a search function based upon the relative incrementality determined above. In one embodiment, optimization is finding a function $f(x)$ that maximizes I. The function $f(x)$ can be searched using tools of numerical optimization, such as gradient descent methods or genetic algorithms. In some embodiments, the search function maximizes the relative incrementality as the optimization.

As an example, the first random factor can be one of the values 0.9, 1.0, 1.1, with the following probabilities:

$\pi(B=0.9)=\frac{1}{4}$, $\pi(B=1.0)=\frac{1}{2}$, $\pi(B=1.1)=\frac{1}{4}$.

In other words, the users are split into three populations, with the second population being twice has big as the others, and the DSPs 130a-130c apply a bid factor of 0.9 in the first population, 1.0 in the second population, and 1.1 in the third population.

In this example, it is assumed that the variable x as two modalities, x1 or x2, independent from the first bid factor. The DSPs 130a-130c then collect the data, aggregating the sum of Y for each value of both x and the bid factor—resulting in the table below:

| | Sum of Y | | |
| --- | --- | --- | --- |
| X/Bid Factor | 0.9 | 1.0 | 1.1 |
| x1 | 90 | 50 | 20 |
| x2 | 60 | 70 | 100 |

For example, the bottom right case of the above table means that 'the observed sum of Y on user of type x2 with a bid factor of 1.1 is 100.')

The DSPs 130a-130c then update the distribution of the random factor. Suppose that the system is given a distribution of random factors π'. For example:

$\pi'(B=1.0)=\frac{1}{4}$, $\pi'(B=1.1)=\frac{1}{2}$, $\pi'(B=1.2)=\frac{1}{4}$.

And assume that the DSPs 130a-130c used this distribution on users of type 'x2' only. The total value of Y on those users with the first distribution was 60+70+100=230. If the DSPs 130a-130c had used instead the second distribution:

The DSPs would get no users with a bid factor of 0.9;

The DSPs would get twice as fewer users with a bid factor of 1.0: π'(B=1.0)/π(B=1.0)=0.25/0.5=0.5. So the DSPs would expect to get twice less of 'Y' on such users: 70/2=35.

But the DSPs would get twice as more users with a bid factor of 1.1: π'(B=1.1)/π(B=1.1)=0.5/0.25=2. So the DSPs would get twice as more Y on those users: 2*100=200.

And the DSPs would get some users with a bid factor of 1.2, but there is no data to predict how they would behave (e.g., because the DSPs did not collect any data with this bid factor: π(B=1.2)=0). The DSPs can then take a cautious estimate, and estimate the value there by 0.

Even with the unknown value on users with a bid factor of 1.2, the DSPs still expect to get at least: 70/2+100*2=235, which is more than the initial value. The DSPs can then decide to keep this new distribution π' for the users of type x2.

On users of type x1, however, using the same distribution is not preferred, at least because the DSPs would expect to get: 50*0.5+20*2=95 (+ maybe some value on users with a bid factor of 1.2), but this is likely much less than what the DSPs got with the first distribution (90+50+20=160). Therefore, it is preferable to use different parameters of the distribution for different values of X.

As a result, how can the DSPs 130a-130c choose the distribution on users of type x1? In one example, the DSPs can always set a bid factor of 0.9 on those users, because it is what may be the best for them. However, if that is done, the DSPs will not be able to update the distribution further.

Therefore, the DSPs first need to better define constraints on this distribution. For example, the DSPs could decide that the distribution should have the following form:

$$\pi(B=0.9+f(x))=¼,$$

$$\pi(B=1.0+f(x))=½,$$

$$\pi(B=1.1+f(x))=¼.$$

The distribution π' used for x2 thus corresponds to setting $f(x2)=0.1$. To choose $f(x1)$, the DSPs can make a line search and apply the same reweighting method and find that $f(-0.1)$ is a good value. Note that in some embodiments, the DSPs use continuous distribution (instead of the previous shape with just three distinct values), which makes it easier to replace the line search by a gradient assent.

It should be appreciated that the process of finding a better bidding policy, denoted in the steps 205, 210, 215, 220, 225, 230 of FIG. 2, can then be repeated by the DSPs 130a-130c. In this context, a better bidding policy means that the bids submitted in response to the bid requests are better estimators of the opportunity value associated with an impression opportunity.

At step 235, once a better bidding policy f1 (e.g., a policy that uses the optimized second randomized bids) is found, the DSPs 130a-130c can change a production bidding policy to conform to the optimized bids. Accordingly, the changed bidding policy can be used by the system to gather new data that would be used in subsequent data analysis and processing to search for a policy (e.g., f2) more incremental than f1, and so on.

An important characteristic of the techniques described herein can be best understood by comparing them to simpler, more naive methods. For instance, one may try to predict the incrementality of a policy by using observational data only (i.e., use empirical data that was collected by a non-randomized policy). In that case, the predicted values are potentially biased by any number of unobserved variables that could influence both the user context X and the outcome Y. Such a bias cannot be easily detected. Contrarily, the method and system described herein is immune to such effects (it is a counter-factual estimator) as it deduces the change in the target outcome based on imposed, random variation of the data generating policy.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A computerized method of incremental bidding for electronic advertisements, the method comprising:
    generating, by a bid determination computing device, for a first user during a first time period, one or more first randomized bids for available impression opportunities presented to a user via a remote computing device in response to one or more bid requests from the remote computing device, the first randomized bids based upon an estimated value and a first random factor selected from a first randomized policy and using a context of the one or more bid requests;
    transmitting, by the bid determination computing device, the one or more first randomized bids to the remote computing device in response to the one or more bid requests;
    determining, by the bid determination computing device, whether one or more interaction events associated with available impression opportunities occurred prior to receiving the one or more bid requests, the interaction events associated with user input provided by the first user to the remote computing device;
    estimating, by the bid determination computing device, one or more second randomized bids for the available impression opportunities based upon the estimated value and a second random factor selected from a second randomized policy and using the context of the one or more bid requests;
    estimating, by the bid determination computing device, a relative incrementality of a bidding policy based upon the second randomized bids over a bidding policy based upon the first randomized bids;
    optimizing, by the bid determination computing device, the bidding policy based upon the second randomized bids using a search function based upon the estimated relative incrementality, comprising maximizing the estimated relative incrementality;
    changing, by the bid determination computing device, a production bidding policy based upon the optimized bidding policy;
    generating, by the bid determination computing device, for the first user during one or more additional time periods, one or more additional randomized bids for available impression opportunities to be presented to the user via a remote computing device in response to one or more bid requests from the remote computing device, the additional randomized bids based upon an estimated value and another random factor selected from the first randomized policy at a start of each additional time period;
    transmitting, by the bid determination computing device, the one or more additional randomized bids to the remote computing device in response to the one or more bid requests;
    determining, by the bid determination computing device, whether one or more interaction events associated with the available impression opportunities occurred during the additional time periods;
    estimating, by the bid determination computing device, a new relative incrementality of a new bidding policy based upon the additional randomized bids over the optimized bidding policy;
    re-optimizing, by the bid determination computing device, the optimized bidding policy based upon the additional randomized bids using a search function based upon the estimated new relative incrementality, comprising maximizing the estimated new relative incrementality; and
    changing, by the bid determination computing device, the production bidding policy based upon the re-optimized bidding policy.

2. The method of claim 1, wherein the remote computing device is a real-time bidding platform, an ad exchange, an ad server, a computing device executing an auction for the available impression opportunities within a browser, or a computing device executing an auction for the available impression opportunities within a native application.

3. The method of claim 1, wherein the one or more interaction events include a view, a click, a conversion, a marketing signup, an account creation, an app installation, or an add-to-cart action.

4. The method of claim 1, wherein the bid determination computing device generates each first randomized bid by multiplying an initial bid for an available impression opportunity by the first random factor.

5. The method of claim 4, wherein the first random factor is not randomized for the first user during the first time period.

6. The method of claim 1, further comprising updating, by the bid determination computing device, the first random factor by selecting another random factor from the first randomized policy.

7. The method of claim 1, wherein the step of determining a relative incrementality is based upon an importance sampling technique.

8. The method of claim 7, wherein the importance sampling technique comprises one or more of: capped importance sampling, self-normalized importance sampling, doubly-robust importance sampling, or variance penalized importance sampling.

9. The method of claim 1, wherein the search function used to optimize the bidding policy based upon the second randomized bids is a gradient descent function or a genetic algorithm.

10. The method of claim 1, further comprising generating, by the bid determination computing device, one or more subsequent bids for available impression opportunities in response to one or more bid requests using the changed bidding policy.

11. The method of claim 10, wherein the available impression opportunities are presented via a webpage on the remote computing device.

12. The method of claim 1, wherein a definition of the first randomized policy and a definition of the second randomized policy are different.

13. The method of claim 1, wherein the first time period and the one or more additional time periods are the same length.

14. The method of claim 1, wherein the first context of the one or more bid requests comprises a context of the first user at a start of the first period.

15. The method of claim 14, wherein the first context of the one or more bid requests comprises historical data for one or more prior impression opportunities associated with the user.

16. The method of claim 1, wherein the second randomized policy is deterministic.

17. The method of claim 1, wherein the available impression opportunities are presented to the user via a website displayed in a browser application on a client computing device of the user.

18. The method of claim 1, wherein the available impression opportunities are presented to the user via a native application on a client computing device of the user.

19. A system for incremental bidding for electronic advertisements, the system comprising:
a bid determination computing device that:
generates, for a first user during a first time period, one or more first randomized bids for available impression opportunities presented to a user via a remote computing device in response to one or more bid requests from the remote computing device, the first randomized bids based upon an estimated value and a first random factor selected from a first randomized policy and using a context of the one or more bid requests;
transmits the one or more first randomized bids to the remote computing device in response to the one or more bid requests;
determines whether one or more interaction events associated with available impression opportunities occurred prior to receiving the one or more bid requests, the interaction events associated with user input provided by the first user to the remote computing device;
estimates one or more second randomized bids for the available impression opportunities based upon an estimated value and a second random factor selected from a second randomized policy and using the context of the one or more bid requests;
estimates a relative incrementality of a bidding policy based upon the second randomized bids over a bidding policy based upon the first randomized bids;
optimizes the bidding policy based upon the second randomized bids using a search function based upon the estimated relative incrementality;
changes a production bidding policy based upon the optimized bidding policy;
generates, for the first user during one or more additional time periods, one or more additional randomized bids for available impression opportunities to be presented to the user via a remote computing device in response to one or more bid requests from the remote computing device, the additional randomized bids based upon an estimated value and another random factor selected from the first randomized policy at a start of each additional time period;
transmits the one or more additional randomized bids to the remote computing device in response to the one or more bid requests;
determines whether one or more interaction events associated with the available impression opportunities occurred during the additional time periods;
estimates a new relative incrementality of a new bidding policy based upon the additional randomized bids over the optimized bidding policy;
re-optimizes the optimized bidding policy based upon the additional randomized bids using a search function based upon the estimated new relative incrementality, comprising maximizing the estimated new relative incrementality; and
changes the production bidding policy based upon the re-optimized bidding policy.

20. The system of claim 19, wherein the remote computing device is a real-time bidding platform, an ad exchange, an ad server, a computing device executing an auction for the available impression opportunities within a browser, or a computing device executing an auction for the available impression opportunities within a native application.

21. The system of claim 19, wherein the one or more interaction events include a view, a click, a conversion, a marketing signup, an account creation, an app installation, or an add-to-cart action.

22. The system of claim 19, wherein the bid determination computing device generates each first randomized bid by multiplying an initial bid for an available impression opportunity by the first random factor.

23. The system of claim 19, wherein the first random factor is not randomized for the first user during the first time period.

24. The system of claim 19, wherein the bid determination computing device updates the first random factor by selecting another random factor from the first randomized policy.

25. The system of claim 19, wherein determining a relative incrementality is based upon an importance sampling technique.

26. The system of claim 25, wherein the importance sampling technique comprises one or more of: capped importance sampling, self-normalized importance sampling, doubly-robust importance sampling, or variance penalized importance sampling.

27. The system of claim 19, wherein the search function used to optimize the bidding policy based upon the second randomized bids is a gradient descent function or a genetic algorithm.

28. The system of claim 19, wherein the bid determination computing device generates one or more subsequent bids for available impression opportunities in response to one or more bid requests using the changed bidding policy.

29. The method of claim 28, wherein the available impression opportunities are presented via a webpage on the remote computing device.

30. The system of claim 19, wherein a definition of the first randomized policy and a definition of the second randomized policy are different.

31. The system of claim 19, wherein the first time period and the one or more additional time periods are the same length.

32. The system of claim 19, wherein the first context of the one or more bid requests comprises a context of the first user at a start of the first period.

33. The system of claim 32, wherein the first context of the one or more bid requests comprises historical data for one or more prior impression opportunities associated with the user.

34. The system of claim 19, wherein the second randomized policy is deterministic.

35. The system of claim 19, wherein the available impression opportunities are presented to the user via a website displayed in a browser application on a client computing device of the user.

36. The system of claim 19, wherein the available impression opportunities are presented to the user via a native application on a client computing device of the user.

* * * * *